United States Patent [19]

McDermott et al.

[11] Patent Number: 4,835,515
[45] Date of Patent: May 30, 1989

[54] VEHICLE-WARNING SIGNAL LIGHT

[76] Inventors: Julian A. McDermott; Mildred A. McDermott, both of 1639 Stephen St., Queens, New York, N.Y. 11385

[21] Appl. No.: 107,688

[22] Filed: Oct. 13, 1987

[51] Int. Cl.$^4$ .............................................. F21Q 01/00
[52] U.S. Cl. ................... 340/472; 340/908; 340/478; 340/489
[58] Field of Search ....................... 116/51, 52, 53, 54; 340/87, 119, 127, 130, 138, 142, 107, 74; 362/66, 80

[56] References Cited

U.S. PATENT DOCUMENTS

| | | | |
|---|---|---|---|
| 1,521,806 | 1/1925 | Elrod | 340/131 |
| 2,644,149 | 6/1953 | Corpora | 340/128 |
| 3,375,365 | 3/1968 | Gross | 340/87 |
| 4,180,010 | 12/1979 | McDermott et al. | 116/209 |
| 4,259,660 | 3/1981 | Oliver | 340/87 |

Primary Examiner—Joseph A. Orsino, Jr.
Assistant Examiner—Annie H. Chan
Attorney, Agent, or Firm—Kenyon & Kenyon

[57] ABSTRACT

This invention relates to a signal warning light device designed to be mounted on the roof of an emergency vehicle. Normally this device, in use, would appear to be a frame holding a line of lights across the top of the vehicle. However, at the scene of an emergency, under control of the driver, bars pivoted at the two ends of the frame would be automatically swiveled upward. When raised fully, the bars would appear vertical and with its vertical array of lights woudl provide approaching drivers with an advanced warning. By limiting the movement of one bar to an acute angle and not fully raising the other bar the effect of a pointing arrow or spear head would be obtained. Thus by selectively controlling the bars to be raised, traffic could be directed to proceed left or right or if the both bars were raised partially, signals to stop, slow as well as right and left may be given. Sequential flashing of the bar mounted lights would emphasize the message when directed toward the "point". Reflex material can also be used instead of electric lights.

24 Claims, 2 Drawing Sheets

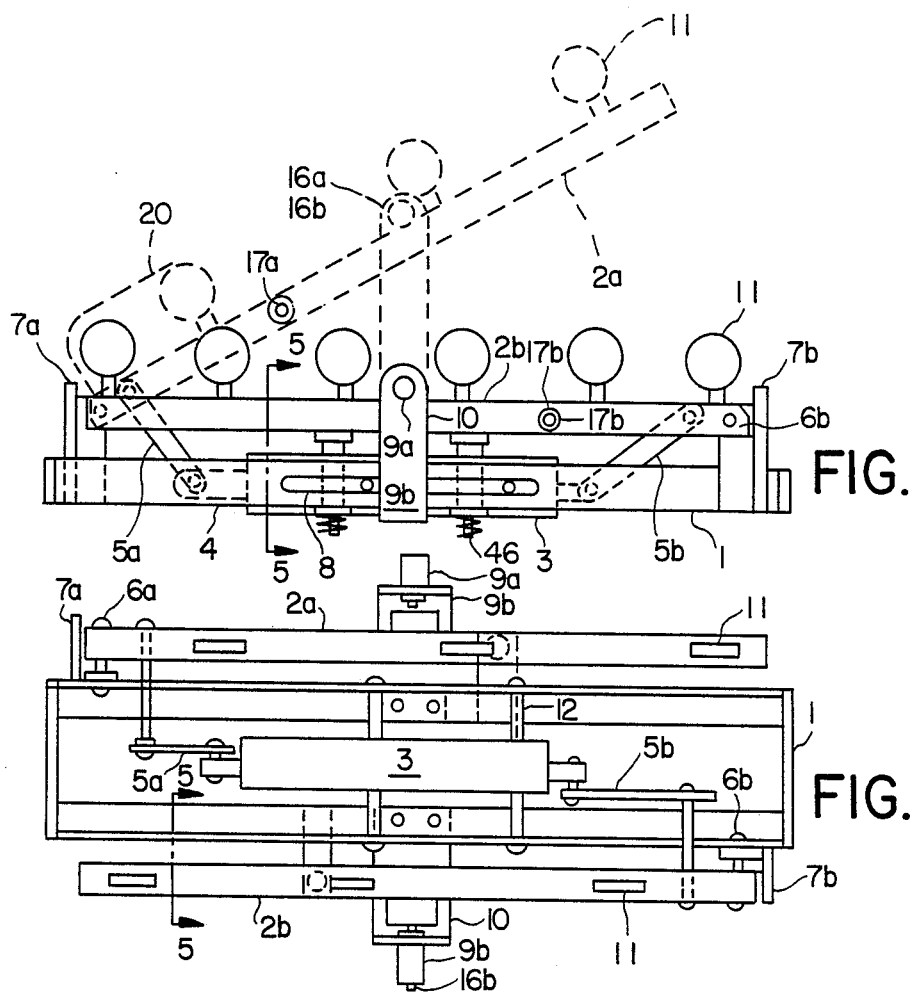
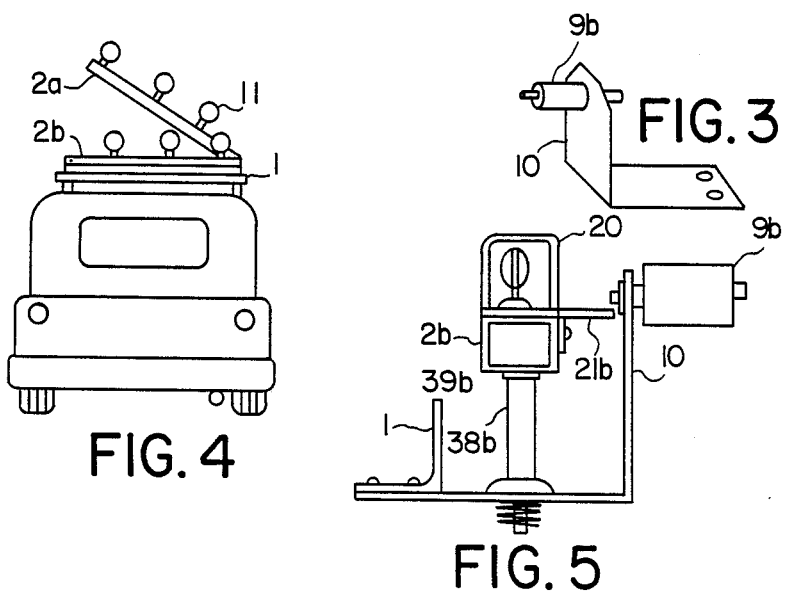

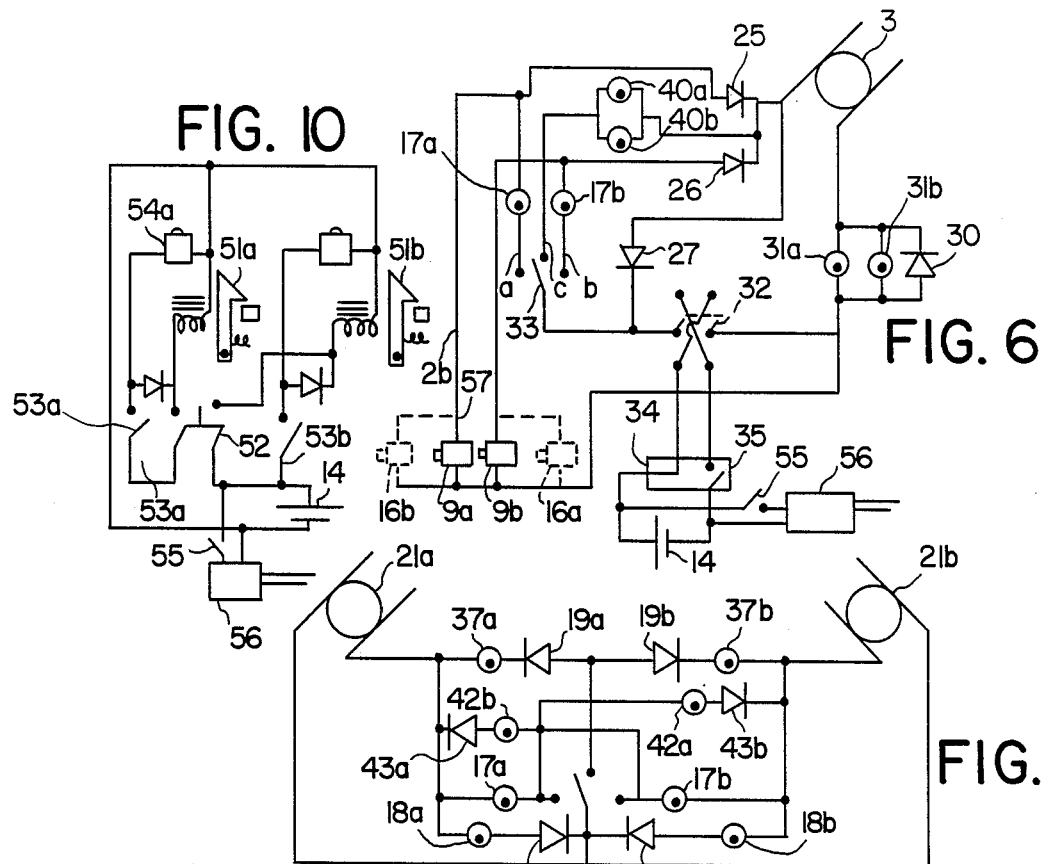
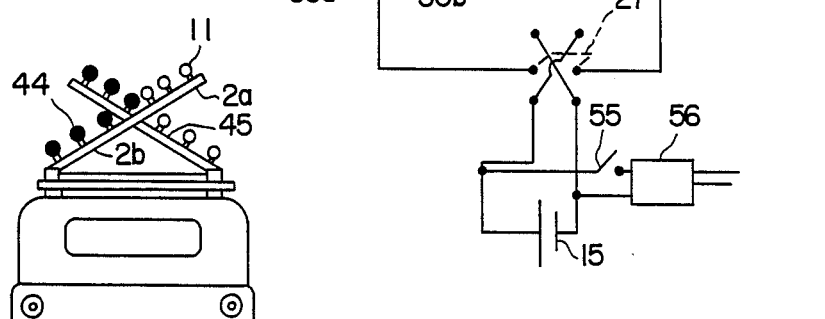
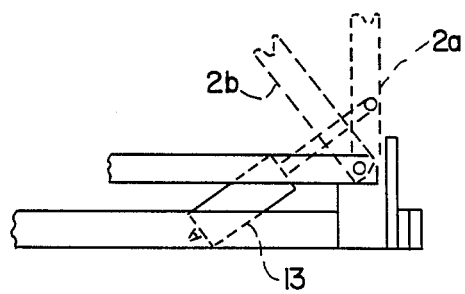

VEHICLE-WARNING SIGNAL LIGHT

This invention relates to warning lights for protecting emergency vehicles but convertable to traffic directing signals.

BACKGROUND OF THE INVENTION

The problem of providing protection for vehicles stopped in traffic has become more complex as vans and trucks obscure vehicles stopped ahead. Warning lights on top of emergency vehicles are also obscured by vans and other traffic.

McDermott under U.S. Pat. No. 4,180,010 offered some help to solve this problem. By providing means to automatically raise the height of the warning lights he reduced the probability of accidents.

An operator of an approaching vehicle is thus notified that there is an obstacle ahead. The vehicle operator must then decide which adjacent lane he can cut into or he must prepare to stop. Confusion can cause an accident. This invention is not only to warn of an obstruction to traffic ahead but also to increase traffic flow and safety by indicating which adjacent lane the driver should take. There has been in recent years the acceptance of portable illuminated arrows at construction sites as means of guiding traffic around such sites. However, such devices require power and are not instantly available or portable. McDermott's original patented warning device did not approach the problem of guidance. It is hoped that this present invention gives answers to five problems. It gives guidance to approaching vehicles. It provides a regular warning light to the vehicle. It is instantly available. It raises the lights above traffic. It provides these features without any special power source by using the vehicle's power. McDermott's original patent had no provision for the individual control of the light bars or partial raising.

SUMMARY OF THE INVENTION

This invention offers a new element in the matter of traffic control. The approaching driver would not only be told of an obstruction ahead but be guided as to which direction i.e. right or left, he is to go to avoid it. He would be informed far enough ahead so that he could fold into the adjacent lane, keep traffic flowing and possibly avoid an accident.

The preferred embodiment produces the effect of an arrow head or chevron stripe by the establishment of the position of two bars holding lights mounted across the top of a vehicle. One bar remains horizontal or is brought to a small angle upwards while the remaining one is brought up to make an larger angle than the first.

A kind of arrow or spear head or the stripe of a chevron is thus formed which traditionally indicates to an approaching driver the direction in which to proceed. The system permits the raising of either or both bars and lamps may be steady burning or flashing on any appropriate pattern.

Reflex units can be considered a kind of lamp. When raised, flashing of the lamps mounted on the bars may be programmed to further emphasize the meaning of the structure. The bars may have their lamps flashed sequentially or set in a chase pattern toward the point or apex to indicate the direction of procedure of traffic required, or all or groups, lamps may be flashed simultaneously to emphasize the direction.

Thus we also have a system which with the bars straight up can mean "obstruction ahead"—stop. This invention is primarily a signal device and transmits specific information to the approaching driver i.e. "what to do".

With one bar at an acute angle with the frame top and the other level or raised to a lesser angle it can mean "go as indicated". It is also possible to raise both bars to make equal angles with the vehicle top which can mean "go right or left".

It is the object of this invention to provide means to increase the safety of motorists and traffic control personnel by providing: devices that can give a prewarning and a guidance to an approaching driver by signaling that a traffic obstruction lies ahead and by the use of lights that may be raised above the top of a control vehicle, by their position indicate "go right", "go left" or go right or left or slow or stop.

A further object is to provide a device including a structure to be mounted across the top of a vehicle that will provide support for bars holding lines of reflectors or signal lights; said bars being pivoted at or near the ends of said structure, said device also including means to achieve the options to mechanically rotate said bars upward individually or together to make specific acute angles with the top of the vehicle or each other, rise to a vertical position or remain horizontal.

It is a still further object of this invention to provide means to automatically control the angles to which said bars may be raised so that they form what may be interpreted as an arrow or spear point or a stripe of a chevron.

It is still a further object to provide equipment for said warning device that would flash its lamps in a simultaneous flash or to flash progressively toward a formed point made by the positioning of the bars to emphasize the indicated direction.

It is still a further object this invention to provide means to rotate said bar or bars up to specific controlled positions less than the vertical.

DESCRIPTION OF THE FIGURES AND PREFERRED EMBODIMENTS

The foregoing and other objects, features and advantages of the invention as well as presently preferred embodiments thereof will become more apparent from a reading of the following description in connections with the accompanying drawings.

FIG. 1 shows a drawing of a plan generally similar to the McDermott design in U.S. Pat. No. 4,180,010. FIG. 6, modified to illustrate the difference in the present application.

FIG. 2 gives a front elevation of the same device.

FIG. 3 shows a detail of a movement limiter.

FIG. 4 shows the appearance of the device mounted on a vehicle where a right direction is indicated.

FIG. 5 shows the limiter mounted on the frame (Section BB) as well as a section through a lamp mounting.

FIG. 6 shows the wiring diagram where a single actuator is able to raise both bars but also where limiters may be used to control the positions of the bars.

FIG. 7 shows the circuiting where each bar has its own actuator.

FIG. 8, shows the mounting of an actuator where each bar has its own actuator.

FIG. 9 shows an arrangement where both bars are raised to acute angle to produce a two direction chevron stripe effect.

FIG. 10 shows a control arrangement where springs serve as actuators.

On drawings numbered 1 and 2, 1 represents the basic frame, 2a and 2b represent the bars that are raised, 3 shows a single linear actuator which provides the physical power to raise the bars. This may be operated by its own motor or be hydraulically or pneumatically operated.

If it is desired to extend the bars up fully, the actuator 3 is energized, plunger arm 4 makes the member 5a force the light bar 2a to rotate around the axle 6a raising it. If unrestrained, the arm would rise to a vertical position limited only by stop 7a.

When the bar 2a reaches its limit, the continued push by the actuator forces its supports 12 to slide through the slots 8 forcing movement by the arm 5b and the rotation of bar 2b about its axis 6b limited only by the stop 7b.

If it is desired to achieve the arrow effect at the time that the actuator is being energized, a solenoid 9b FIG. 3 movement limiter, supported by bracket 10 moves its elements into position to block or limit movement of bar 2b.

At the same time movement of the second arm is unrestrained until it reaches a predetermined position such as 40 degrees with the horizontal when the power to the linear actuator would be cut off by a limit or gravity switch 17a, or a valve operation if the actuator is liquid or pneumatic.

The bars being equipped with rows of lights such as 11 FIG. 2 form a pattern of an arrow, chevron stripe illustrated by FIG. 4. Lamps may be steady burning, flashed together, sequentially or chased toward the point.

The bars shown as 2a and 2b, FIG. 1 and 5 may include both the lamp cover 20 and the structural bar. The bar can be made of transparent plastic and large enough to accommodate the lamps in its interior. FIG. 5 also shows the bar 2b as held down by the solenoid 9b. An extension of the bar 21b FIG. 5 provides the necessary contact point to the solenoid limiter.

If as an alternate to the solenoids, an electromagnet is to hold the bar down it would appear in FIG. 1, 2 and 5 as items 39a and 39b which represent steel plates attached to the bar and 38a and 38b representing magnetic coils. Spring 46 FIG. 5 would allow some upward movement of a bar.

If it is desired to raise both bars to make larger angles with the frame, each solenoid limiter mount 10b FIG. 3 may be equipped with a second solenoid 16a and 16b FIG. 1 to intercept a bar at a raised angle. A point, chevron or arrow head is made by the intersection of the two bars.

Using two solenoids to hold bars at different heights allows the control of the width of the angle between them as well as bringing the "aim of" the arrows up.

One variation this design allows for is letting one light bar go up to make an angle of less 60 degrees such as 30 degrees with the horizontal. The second bar is also set to go up to the same angle, as the first, so that they cross each other. If the angles are the same, sections right or left or of the crossing form equal chevron stripes. FIG. 9 shows such an arrangement. Lights are identified as 44-45 FIG. 9 but only those lights 44 on the right hand side would be illuminated if left is the desired control direction. Each side would be lighted alternately if right and left diversion is required.

If it is not desired to use the single actuator, two actuators, shown as 13 FIG. 8, 21a and 21b FIG. 7 can raise their respective bars. To produce the chevron only one actuator might be energized and again limit or gravity switches could serve to limit the movement to an acute angle. One actuator might not be energized so that one bar would remain horizontal. Where two actuators are used, the limit or gravity switches controlled by the position of the bars can be circuited to limit the motion of either or both bars to any angle required to get the arrow or chevron effect. Timing of each electrical actuator circuit might also be used to control the distance traveled.

FIG. 6 shows a wiring diagram for the control of the bars where a single actuator is used such as on FIG. 1 and 2. On this diagram item 32 represents a double pole double throw switch that by reversing its position can establish if the bars will be raised or lowered.

The settings on selector switch 33 FIG. 6 determines whether the signaled direction is to be left or right, or just a warning using vertical bars. Closing switch 32 starts the actuator and the bar moves.

These switches also control limiter solenoids 9a, 9b 16a and 16b all of which can stop the bars from moving past a certain point.

The diodes 25 and 26 and the gravity or limit switches 17a and 17b are bypassed by the diode 27 when the bars are to be brought down. Limit or gravity switches set and placed as 31a and 31b can be used to stop the actuator when the bars reach a level position (down) if the timing switch 34 and 35 FIG. 6 is not used. Diode 30 provides bypass on raising.

The actuator is shown as 3 and power supply as 14. FIG. 1 shows the position of solenoid 16a and 16b which can be used to mechanically limit the movement of either bar at higher acute angles. Circuiting would have to be in the same positions as items 9a and 9b FIG. 6 to permit this and this feature is particularly useful where both bars are raised to achieve the double chevron effect of FIG. 9.

Using FIG. 6, four methods of operation can be shown.

Normally, closing of switch 33c and then closing of switch 32 causes the full raising of the bars until stopped by the mechanical limit 7a and 7b FIG. 1. The timer circuit 34 and 35 FIG. 6 would, after awhile, cut off the power. Taking down would occur with the reversal of switch 32.

For directional signals switch 33a (33b) would be closed then 32 and the bar would rise only until stopped by limiter 9a(9b) while the other would rise to the higher acute angle when stopped by gravity switch 17a (17b) which shut off the power.

The alternate method of control is to use limit or gravity switches 40a, 40b, 31a, and 31b to stop the motion when full rising or lowering of the bars is required. The timing circuit is not necessary.

A fourth method of control is to use limiters similar to 16a, 9b FIG. 1 together to stop the motion of one bar low and the other high. The timer would be used to cut off the power. The gravity switches 17a and 17b shown would not be necessary.

Normally 9a or 9b hold the lower bar down and the gravity switches 17a or 17b stop the top bar. However, by using two limiters the gravity switches 17a and 17b can be eliminated. Thus the use of 9a and 16b FIG. 6 could give a high bar and a low one if so arranged, giving the desired arrow chevron.

Although shown as solenoids the solenoid movement limiter may be made in a number of forms. It may be a hook, electrically operated and such a hook or latch can stop movement of the bar not only when it is down but also in a somewhat raised position as might be required for chevron effect and multiple hooks can be used for different spacing effects. Wherever gravity switches are called for, they would have to be set so that they would bring the bar to the required position.

Springs particularly air springs can serve as actuators particularly if used in pairs and mounted as 13 FIG. 8 and controlled as in FIG. 10. In elevating one side for directing traffic closing the switch 53a FIG. 10 would activate solenoid limiter 54a and also open the latch 51a to release bar 2a, FIGS. 1 and 10.

The bar could only rise as far as the limiter would let it thus forming the required acute angle for single direction control, assuming that the other bar is undisturbed.

After use the bars would have to be returned to a normal position manually.

If the second bar is to be raised even to a smaller amount, a second latch and limiter would have to be added and circuited for each bar. Solenoids would include positioning retainers which would hold bar after retainers energizing current stopped.

If both bars are to be raised fully, electrical latches 51a and 51b (one for each side) holding down the light bars 2a and 2b (as in FIG. 1) would be released by the closing of double pole switch 52.

The springs, operating with dampers would cause the bars to rise slowly to positions. The vehicle battery will supply power for control.

FIG. 7 shows the circuiting if two separate electrical linear actuators are to be used. The selector switch 28 directs energy for both actuators 21a and 21b when it is in its center position. If a left command is required the selector 28 is set for one of the actuators for example 21a and the master switch 27 is positioned to supply power to actuator 21a bringing one bar up to its acute angle position established by its gravity or limit switch 17a. Gravity or limit switches 42a and 42b and their diodes 43a and 43b, allow for bringing the second bar up usually to a lower point. This is also useful to get a more horizontal arrow or an effect like FIG. 9. Changing polarity of the actuator by means of switch 27 would result in the bar being lowered. If the switch 28 is set in its center position both bars will be raised. When they reach their full vertical "up" position the actuator would be stopped by gravity switches 37a and 37b. Gravity or limit switches 50a and 50b with diodes 18a and 18b FIG. 7 would stop movement when bars are brought down. Diodes 19a and 19b prevent feedback and so would prevent raising both sides when only one is wanted. 18a and 18b provide bypass on voltage reversal on lowering. Items 55 and 56 represent the lamps flasher control.

In the system used for FIGS. 1, 2 and 5 where only one actuator is used it is arranged that when the actuator is energized one bar would be restrained by the solenoid while the other is allowed to rise to an acute angle controlled by a gravity switch. If a second limiter is used, the power is ultimately cut off by the timer switch.

The solenoids considered so far have an armature that moves out to provide the blocking of the bar.

If instead, the solenoids are the type that have their armatures normally out and pull inside the coil when activated they would at all times be blocking both bars.

To achieve the chevron point effect only one of the solenoids would be activated, freeing one bar to rise at the same time the linear actuator is energized. This would require a change in the wiring diagrams shown but the same effect would be achieved.

While the above description contains many specificities, their should not be construed as limitations on the scope of the invention, but rather an examplification of one preferred embodiment: there of, many other variations are possible for example: The actuators can include slip clutches to prevent damage when their limit is reached and time delay electrical circuits limit the time that electricity will be supplied on each function.

Where linear actuators are shown to achieve the rotation upward of the bars, rotary motors mounted at the pivot points can achieve the same results particularly if a motor is used for each bar. In order to handle the power requirements, relays or solid state elements may be used and although electric lights would seem most effective reflectors accepting and reflecting illumination from other vehicles could serve.

Accordingly, the scope of the invention should be determined not by the embodiment illustrated, but by the appended claims and their legal equivalents.

The flashing of the lights and actuator control may be accomplished by solid state devices or relays to produce any of the described effects.

Although individual light sources are shown, linear light sources may be used.

Gravity or limit switches, where called for, would be operated by the movement of a bar to a certain position.

Where means to hold down the bars are described particularly as magnets or solenoids, electrical latches may be used. The limiters although shown as solenoids limiting the movement of the bars themselves could be put into position to restrain the movement of the bars by blocking the actuator movement or the couplings attached thereto or movement through the slots 4 FIG. 1.

In all designs multiple lamps would be used and where drawings show power supply such as a battery any DC power supply with compatable power can serve.

The flashing control is shown as item 55 and light on-off control as 56 on drawings 5, 6 and 10.

In this invention, the light bars have been used as a means to communicate limited intelligence by the use of a few positions of the bars. It is to be considered that there can be further use of the positions to which the bars could be set to send additional coded information.

The circuits shown as FIGS. 7 and 10 can get the effect of the crossed bars of FIG. 9 by activating of the right and left controls in succession. Hinges could be used instead of pivots on bars.

By substituting 16b for 9a in FIG. 6 and adding switch 57, switch 33a with both limiters in use will control the bars to get the effect of FIG. 9.

What is claimed is:

1. In a traffic control system that may be mounted on the top of a vehicle, a frame to be mounted horizontally across the top of said vehicle, two bars with lights thereon extending across said frame and each pivoted at an end of said frame, actuator means to rotate at least one of said bars upward on its pivot and electromechanical means to stop such rotation at such a degree that the bar makes a specific acute angle with the horizontal and timing switch means to limit the time of operation of the actuator.

2. In a traffic control system as described in claim 1 but further comprising means to raise both bars with one linear actuator and means to stop the movement of each bar to a different acute angle as related to the horizontal.

3. In a traffic control system as described in claim 1 but further comprising means to rotate said bars to such angular degrees that they would appear as a single chevron or point as is used for indicating direction.

4. In a traffic control system as described in claim 1 but further comprising means to raise said bars to such a degree that they form arrow points indicating right or left; or right and left.

5. In a traffic control system as described in claim 1 but further comprising means to flash lamps on said bars sequentially toward the point of the intersection of said bars one with the other.

6. In a traffic control system as described in claim 1 but further comprising means to raise said bars using a separate actuator for each and means to individually control the movement of each such that it will be stopped at such a point that it forms a specific acute angle with the horizontal.

7. In a traffic control system as described in claim 1 but further comprising means such that both of said bars will be raised but stopped at the same acute angle that each makes with the horizontal, said angle being less than 60 degrees with the horizontal.

8. In a traffic control system as described in claim 1 but further comprising means to operate said lights so that they would burn steadily, flash singlely, flash all together or flash in groups.

9. In a traffic control system as described in claim 1 but further comprising means to flash said lights sequentially toward the angle point made by the bar's intersection one with the other.

10. A vehicle warning signal device comprising
a pair of bars, each said bar being pivotally mounted on a horizontal axis to move between a horizontal position overlapping with the other bar and a vertical position;
a series of lights on each said bar;
actuator means connected to said bars for moving each bar between said horizontal position and said vertical position thereof;
limiter means for limiting movement of each respective bar between said positions thereof; and
light energizing means for selectively energizing at least some of said lights on a respective bar.

11. A vehicle warning signal device as set forth in claim 10 wherein one of said bars is movable into an angular position relative to the other of said bars to provide an arrowhead effect therewith.

12. A vehicle warning signal device as set forth in claim 11 wherein said light energizing means energizes said lights on said one bar in a flashing sequence.

13. A vehicle warning signal device as set forth in claim 10 wherein said bars are movable into a crossing position relative to each other and said light energizing means simultaneously energizes said lights on an upper part of one bar and said lights on a lower part of the other bar to provide an arrowhead effect.

14. A vehicle warning signal device as set forth in claim 10 wherein said actuator means includes a single actuator connected to and between said bars for moving said bars.

15. A vehicle warning signal device as set forth in claim 10 wherein said actuator means includes a pair of actuators, each said actuator being connected to a respective bar to move said respective bar between said positions thereof.

16. A vehicle warning signal device as set forth in claim 10 wherein said limiter means is selected from the group consisting of electromagnetic limiting means and solenoid means.

17. A vehicle warning signal device as set forth in claim 10 wherein said limiter means includes at least one limit switch to limit movement of a selected bar between said positions thereof.

18. A vehicle warning signal device as set forth in claim 10 wherein said limiter means includes at least one gravity operated switch means to limit movement of a selected bar between said positions thereof.

19. A vehicle warning signal device comprising
a pair of bars, each said bar being pivotally mounted on a horizontal axis to move between a horizontal position overlapping with the other bar and a vertical position;
a series of lights on each said bar;
actuator means for moving each bar into at least one intermediate position between said horizontal position and said vertical position thereof; and
light energizing means for selectively energizing at least some of said lights on a respective bar.

20. A vehicle warning signal device as set forth in claim 19 wherein one of said bars is movable into an angular position relative to the other of said bars to provide an arrowhead effect therewith.

21. A vehicle warning signal device as set forth in claim 19 wherein said bars are movable into a crossing position relative to each other and said light energizing means simultaneously energizes said lights on an upper part of one bar and said lights on a lower part of the other bar to provide an arrowhead effect.

22. A vehicle warning signal device as set forth in claim 19 wherein said actuator means includes gravity operated switch means for interrupting an actuator current supply to control the degree of pivoting of a respective bar and establish an angular relation of said respective bar to said horizontal position thereof.

23. A vehicle warning signal device comprising
a frame for mounting on a vehicle;
a pair of bars, each said bar being pivotally mounted on said frame for pivoting between a horizontal position overlapping with the other bar and a vertical position;
light reflex devices mounted on each said bar; and
actuator means for moving each bar into at least one intermediate position between said horizontal position and said vertical position thereof to provide one of an arrowhead effect and a crossed effect.

24. In a device for mounting lights on the top of a vehicle,
a frame to be mounted horizontally across the top of said vehicle;
two bars with lights thereon extending across said frame and each pivoted at an end of said frame,
actuator means to rotate at least one of said bars upward on said frame; and
electro-mechanical means to stop rotation of a respective bar at such a degree that said bar makes a specific acute angle with the horizontal.

* * * * *

UNITED STATES PATENT AND TRADEMARK OFFICE
CERTIFICATE OF CORRECTION

PATENT NO. : 4,835,515

DATED : May 30, 1989

INVENTOR(S) : Julian A. McDermott

It is certified that error appears in the above-identified patent and that said Letters Patent is hereby corrected as shown below:

```
In the Abstract, line 9 "woudl" should be -would-
Column 1, line 54 "an" should be -a-
Column 2, line 38 "object this" should be -object of this-
Column 5, line 25 "retainers" should be -retainers'-
Column 5, line 56 "lamps" should be -lamps'-
Column 6, line 7 "their" should be -they-
Column 6, line 9 "embodiment: there of," should be -embodiment
     thereof,-
Column 6, line 20 "effective reflectors" should be -effective,
     reflectors-
Column 6, line 42 "compatable" should be -compatible-
```

Signed and Sealed this

Nineteenth Day of November, 1991

Attest:

HARRY F. MANBECK, JR.

*Attesting Officer*    *Commissioner of Patents and Trademarks*